United States Patent [19]

Emblem et al.

[11] Patent Number: 4,810,441
[45] Date of Patent: Mar. 7, 1989

[54] PROCESS FOR THE PREPARATION OF A CERAMIC FIBER

[75] Inventors: Harold G. Emblem, Southport; Kenneth Jones, Tyldesley; Jonathan M. Boulton, Epsom, all of England

[73] Assignee: Clinotherm Limited, West Yorkshire, England

[21] Appl. No.: 843,584

[22] Filed: Mar. 25, 1986

[30] Foreign Application Priority Data

Apr. 2, 1985 [GB] United Kingdom ............... 8508583
Oct. 21, 1985 [GB] United Kingdom ............... 8525884

[51] Int. Cl.$^4$ ............................................. D01F 9/08
[52] U.S. Cl. ................................. 264/56; 264/29.2; 264/164; 264/210.6; 264/210.8; 264/211; 501/95; 501/127; 501/153; 252/315.01; 252/315.1; 252/315.7; 106/287.17
[58] Field of Search ................. 501/95, 127, 153; 264/29.5, 56, 61, 183, 29.2, 164, 210.6, 210.8, 211; 252/315.01, 315.7, 315.1; 106/287.17

[56] References Cited

U.S. PATENT DOCUMENTS

| | | | |
|---|---|---|---|
| 3,637,406 | 1/1972 | Bailey | 501/153 |
| 3,808,015 | 4/1974 | Seufert | 501/95 |
| 3,865,917 | 2/1975 | Galasso et al. | 264/183 |
| 3,950,478 | 4/1976 | Kenworthy et al. | 501/127 |
| 3,975,202 | 8/1976 | Emblem et al. | 501/127 |
| 3,983,197 | 9/1976 | Nhitsche et al. | 501/153 |
| 4,320,074 | 3/1982 | Birchall et al. | 501/127 |
| 4,474,745 | 10/1984 | Ritter . | |
| 4,512,913 | 4/1985 | Ritter | 106/287.17 |
| 4,545,924 | 10/1985 | Ritter . | |
| 4,574,003 | 3/1986 | Gerk | 501/153 |

FOREIGN PATENT DOCUMENTS

| | | |
|---|---|---|
| 1172649 | 8/1984 | Canada . |
| 0004730 | 10/1979 | European Pat. Off. . |
| 0948132 | 1/1964 | United Kingdom . |
| 0948136 | 1/1964 | United Kingdom . |
| 0948137 | 1/1964 | United Kingdom . |
| 1009959 | 11/1965 | United Kingdom . |
| 1159658 | 7/1969 | United Kingdom . |
| 1267959 | 3/1972 | United Kingdom . |
| 1356248 | 6/1974 | United Kingdom . |
| 1360200 | 7/1974 | United Kingdom . |
| 1360199 | 7/1974 | United Kingdom . |
| 1360197 | 7/1974 | United Kingdom . |
| 1466241 | 3/1977 | United Kingdom . |
| 1481571 | 8/1977 | United Kingdom . |
| 2004263 | 3/1979 | United Kingdom . |
| 1548866 | 7/1979 | United Kingdom . |
| 1548867 | 7/1979 | United Kingdom . |
| 2017129 | 10/1979 | United Kingdom . |
| 1555459 | 11/1979 | United Kingdom . |

*Primary Examiner*—Jan H. Silbaugh
*Assistant Examiner*—Hubert C. Lorin
*Attorney, Agent, or Firm*—Parkhurst, Oliff & Berridge

[57] ABSTRACT

A ceramic fiber is prepared without the need for a fiber-forming organic polymer or a coagulating bath by forming a homogeneous clear solution from an aluminum halohydrate organic complex dissolved in a mixture of water and a C1–C4 alcohol from which a clear homogeneous precursor filament is drawn and fired, which complex is obtained from an aluminum halohydrate and a polyol containing 2 to 6 carbon atoms and at least 2 hydroxy groups.

10 Claims, No Drawings

PROCESS FOR THE PREPARATION OF A CERAMIC FIBER

This invention relates to the formation of clear rigid coherent gels and ceramic oxide fibers from soluble complexes of aluminum halohydrates. The preferred complexes are alcohol-soluble complexes of aluminum chlorhydrates, formed by combining aluminum chlorhydrates with polyhydroxy compounds such as propylene glycol or glycerol (1,2,3-trihydroxypropane).

In general, ceramic oxide fiber precursors may be made by dissolving the appropriate metal compound or compounds in a suitable solvent and dissolving in this solution an organic polymer which will enable a fiber to be formed from the resulting solution. This procedure is described in British Pat. No. 1,360,197. According to this Specification, the metal compound may be a salt or a sol and the solvent may be water. The organic polymer content should be less than 10% by weight of the metal compound, preferably 0.1–2.0% by weight and the molecular weight of the polymer should be in the range $10^3$–$10^7$. There should be little or no reaction between the metal compound and the organic polymer. British Pat. No. 1,360,199 describes the use of a polyethylene oxide in this process and British Pat. No. 1,360,200 describes the use of a polyvinyl alcohol or a partially hydrolysed polyvinyl alcohol in this process. Alumina ceramic fiber precursors may be obtained by these procedures if the metal compound is an aluminum chlorhydrate or an aluminum chlorophosphate. The precursor is converted to an alumina ceramic fiber on firing.

An alumina ceramic fiber precursor may also be obtained by dissolving an aluminum chlorhydrate in water, concentrating the solution until the viscosity is in the range 1505–3000 centipoise and extruding this concentrated solution into a coagulating bath which is ethanol, isopropanol or tertiary butanol, or a mixture of acetone with either ethanol or isopropanol. The preferred aluminum chlorhydrate is $Al_2(OH)_5Cl$. This process is described in U.S. Pat. No. 3,865,917.

The addition of fine particles of alpha-alumina to a spinnable system containing an aluminum salt is described in U.S. Pat. No. 3,808,015. This is stated to reduce shrinkage on firing.

Gels suitable for binding refractory grains may be obtained from solutions of aluminum chlorhydrates in water/alcohol mixtures. The preparation of these gels is described in U.S. Pat. No. 3,975,202.

In this specification we will, in general, refer to the final fired filamentary product as a "fiber" and the extruded or otherwise spun product as a "filament".

According to the present invention, a process for the preparation of a ceramic fiber and/or monolithic material comprises forming a homogeneous solution by dissolving in water or in a $C_1$–$C_4$ alcohol or in a mixture of water and the said alcohol an aluminum halohydrate organic complex formed from an aluminum halohydrate and a polyol containing 2 to 6 carbon atoms and at least two hydroxy groups, optionally including an organic silicate containing at least one $C_1$–$C_6$ alkoxy group and evaporating solvent until the solution forms a filament or clear coherent gel which on firing forms a ceramic fiber or a monolithic material.

If desired, the homogeneous solution can contain salts or alkoxides of other elements, to form a product or products which, for instance, assist in filament or fiber formation, or in controlling the structure development of the filament or fiber, or in improving working properties, provided of course that their presence do not interfere with the formation of clear coherent gels and/or filaments. Examples of such additives include the chlorides of calcium, magnesium, chromium and zirconium, also the alkoxides of boron, for instance triethyl borate. For instance, the addition of magnesium chloride to a solution which does not contain an organic silicate can give a ceramic fiber in which the crystalline phase is spinel. If desired, the amount of magnesium chloride added may be sufficient to give a solution in which the molar ratio $Al_2O_3$:MgO is 1:1 (i.e. spinel).

To be able to form filaments and/or clear coherent gels, the solution must be homogeneous. The amount of water and amount of solvent are therefore important. The clear coherent gels and filaments may be dried and fired to remove any remaining organic material, to give monolithic materials and fibers. It is thought that during evaporation of the solvent, hydrolysis and condensation—polymerisation reactions cause a steady increase in the viscosity and at a particular point, filaments can be formed from the solution, ultimately a clear and coherent gel, which is rigid is obtained. When an alkyl silicate is present, the reaction temperature is preferably 60° C. or higher. Depending on the reaction temperature and reaction time, filaments may be obtained before the solution sets to a clear and coherent gel. It is important to note that the formation of filaments and/or clear coherent gels according to the present invention does not need the gellation-inducing accelerators necessary for binding refractory grains, when using either the solutions containing silicon and aluminum whose preparation is described in British Pat. Nos. 1,356,248 and 2,004,263 as well as in U.S. Pat. No. 3,979,215, or the solution containing aluminum whose preparation is described in U.S. Pat. No. 3,975,202. Preferably the solution containing an alkyl silicate contains aluminum and silicon in the oxide stoichiometry required for mullite, an aluminum silicate of the formula $3Al_2O_3$—$2SiO_2$.

Usually it is convenient to dissolve the aluminum halohydrate organic complex in water. To prepare an aluminosilicate material it is convenient to dissolve the aluminum halohydrate organic complex in a solution of the organic silicate in an alcohol such as ethanol.

The preferred aluminum hydroxyhalide organic complexes are formed from aluminum halohydrates or hydroxyhalides as represented by the formula:

$Al_2(OH)_nX_{6-n}$ where X is Cl, Br or I and n is 1–5 and polyols selected from the group comprising:

1, 2 propylene glycol
1, 1, 1 trimethylolpropane
1, 3 butane diol
1, 2, 3 trihydroxypropane
2 methyl 2, 4 pentanediol
2, 2 dimethyl 1,3 dihydroxypropane The preferred halohydrate is a chlorhydrate in which n is 5.

The preparation of the preferred aluminum chlorhydrate organic complexes is described in British Pat. No. 1,159,658 and in U.S. Pat. No. 3,420,932. The complexes are obtained from aluminum chlorhydrate. British Pat. No. 1,009,959 describes the preparation of aluminum chlorhydrate organic complexes by reacting an aluminum compound of the formula $Al_2Cl_{6-n}(OH)_n$ where n is 1–5 with a hydroxylic reagent selected from aliphatic alcohols containing at least two hydroxy groups, the reaction being carried out in the presence of at least sufficient water to dissolve all the aluminum compound, followed by removal of water. Aluminum chlorhydrate organic complexes may also be directly prepared from aluminum as described in British Pat. No. 1,267,959 also as in U.S. Pat. No. 3,507,859. Aluminum metal is treated with a polyhydroxy compound having 2 carbon atoms each linked to a hydroxy group (e.g. 1,2 propylene glycol) with either or both of AlCl$_3$ and HCl (in aqueous solution), then drying the resulting solution. By this procedure, complexes of the type

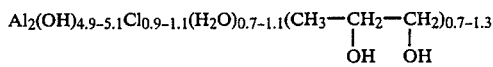

may be prepared.

The exact structure of the aluminum chlorhydrate organic complexes is not known with certainty. They may be momomers or they may be polymeric materials containing oxo [—o—] links. The preferred aluminum chlorhydrate organic complexes are complexes of 1,2-propylene glycol. Organic complexes of aluminum chlorhydrate are available under the U.K. Registered Trade Mark of REHYDROL.

The preferred alcohol solvent is ethanol and preferred solvents are mixtures of ethanol and water. The ethanol may also be the U.K. 74 over proof I.M.S. or the U.K. 64 over proof I.M.S. (I.M.S. is industrial methylated spirits). Conveniently, the solvent may be allowed to evaporate at ambient temperature until the solution will form a filament, or the solvent may be evaporated under reduced pressure at a temperature higher than ambient temperature. Precursor filaments may conveniently be formed by drawing filaments from the solution. Other ways of obtaining filaments are known and these ways can be used if desired. The alumina precursor filaments form alumina ceramic fibers on firing.

The preferred organic silicate is ethyl silicate, traditionally prepared by treating tetrachlorosilane with ethanol. When anhydrous ethanol is used, the product is tetraethoxysilane (ethyl orthosilicate) Si(OEt)$_4$ with hydrogen chloride as by-product. In the industrial preparation, the ethanol used invariably contains some water (industrial spirit), hence the product obtained consists of a mixture of tetraethoxysilane and ethoxypolysiloxanes (ethyl polysilicates) which are formed by condensation—polymerisation reactions resultant on water being present and being catalysed by the hydrogen chloride by-product. Reaction conditions are chosen to yield a product which will give on ignition SiO$_2$ equivalent to 40% w/w, which corresponds to a mixture of ethoxysiloxane oligomers with an average of 5 silicon atoms. This material is known as technical ethyl silicate —40, or ethyl silicate —40. It is the preferred ethyl silicate in the present invention because it contains oligomeric material which enhances filament formation. Other methods for the production of mixtures of tetraethoxysilane and ethoxypolysiloxanes are given in British Pat. No. 2,017,129. European Pat. No. 0,004,730; Canadian Pat. No. 1,172,649 and U.S. Pat. No. 4,211,717.

The preparation of isopropyl polysilicate mixtures is described in British Patent Specification Nos. 948,132, 948,136 and 948,137. The preparation of the other alkyl orthosilicate-polysilicate materials is described in U.S. Pat. No. 3,244,739.

Fibers made according to the present invention may be used as thermal insulating materials, also in the construction of thermal insulating units based on fibrous materials. The filaments may be used as preprepared, or they may first be dried and fired to remove any remaining organic material. Fibers made according to the present invention may be used to manufacture a lining element for the hot-face surface of a furnace following the procedures set out in British Pat. Nos. 1,466,241 and 1,481,571. They may also be used in the construction of the thermal insulating units and in the procedures described in U.S. Pat. Nos. 4,194,036 and 4,324,602, also in British Pat. Nos. 1,548,866 and 1,548,867. They may also be used in the manufacture of the two-layer heat insulating liner for furnace construction which is described in British Pat. No. 1,555,459, and in U.S. Pat. No. 4,344,753. Transparent monolithic materials made according to the present invention may be used to make sight-glasses for furnaces. Fibers made according to the present invention may be suitable for use in fiber optics.

The invention is illustrated by the following examples in which the preferred complex of aluminum chlorhydrate and 1,2 propylene glycol is used and the preferred ethyl silicate, technical ethyl silicate (ethyl silicate —40, SiO$_2$ equivalent to 40% by weight is used.

EXAMPLE 1

13.44 g of the aluminum chlorhydrate propylene glycol complex sold under the trade mark of REHYDROL as REHYDROL II was dissolved in a solution of 5.0 g technical ethyl silicate (SiO$_2$ equivalent to 40% by weight) and varying amounts of ethanol; then varying amounts of water were added to the resulting solution. These solutions were refluxed giving very viscous liquids (in some cases temperatures were kept below reflux). Filaments were formed by inserting into and pulling out of the solution a glass rod 10 mm in diameter. Table I gives the conditions under which the filaments were formed, also the properties of the resulting filaments.

TABLE I

| | | | | |
|---|---|---|---|---|
| Formation of filaments from aluminum chlorhydrate propylene glycol complex and technical ethyl silicate | | | | |
| Vol. of ethanol (cm$^3$) | Vol. of water (cm$^3$) | Time to reach Reflux (min) | Reflux Time (min) | Length of filament (cm) |
| 15 | 2.5 | 8 | 31 | ca 5 |
| 20 | 2.5 | 10 | 63 | ca 1 |
| 15 | 2.5 | 6 | 33 | ca 1 |
| 17.5 | 2.5 | 7 | 43 | ca 1 |
| 17.5 | 1.55 | 9 | 75 | 1–2 |
| 22 | 5.5 | 2 | 30 | 1–2 |
| 17.5 | 5.5 | 5 | 30 | 1 |
| 17.5 | 1.75 | 70–79° C. for 70 min | | 7.5 |
| 17.5 | 1.25 | 70–79° C. for 55 min | | 10–12 |
| 17.5 | 0.75 | 70–79° C. for 77 min | | 15 |

TABLE I-continued

Formation of filaments from aluminum chlorhydrate propylene glycol complex and technical ethyl silicate

| Vol. of ethanol (cm³) | Vol. of water (cm³) | Time to reach Reflux (min) | Reflux Time (min) | Length of filament (cm) |
|---|---|---|---|---|
| 17.5 | 0.55 | 70–79° C. for 112 min | | 10 |
| 17.5 | 0 {Water obtained from solvent ethanol} | 4 | 90 | Solution left to stand for 4 days gave filaments 7.5 cm long |

EXAMPLE 2

13.44 g of the aluminum chlorhydrate-propylene glycol complex sold under the Trade Mark REHYDROL as REHYDROL II was dissolved in a solution of 5.0 g technical ethyl silicate (SiO$_2$ equivalent to 40% by weight) in varying amounts of ethanol. In some cases varying amounts of water were added to the resulting solution. Varying amounts of ethanol were removed by distillation under reduced pressure and the residue poured into a sample tube and periodically tested for filament formation by inserting into and pulling out from the residue a glass rod 10 mm in diameter. The results are given in Table II All gels were coherent gels.

TABLE II

Preparation of Filaments and rigid coherent gels

| Vol. of EtOH Initially (cm³) | Vol. of H$_2$O Initially (cm³) | Boiling point (B.P.) of solution (°C.) | Time to reach B.P. (mins) | Time at B.P. (mins) | Vol. of Ethanol removed (cm³) | Comments |
|---|---|---|---|---|---|---|
| 27 | 0 | 68 | 28 | 22 | 13 | 1–2 cm filament formation immediately. After ca 24 hours filament up to ca 50 cm formed. The solution gelled to a clear gell (yellow tinge) after another period of 4.5 hours. |
| 27 | 0 | 59 | 15 | 16 | 15.5 | 7.5 cm filament formation immediately. After 1 hr. 15 cm filament formed. After another 1.75 hrs, filaments up to 50 cm could be formed. After a further period of ca 21.5 hrs. filaments of 8.5–10 cm formed. Gelled overnight to give a clear gel (yellow tinge) |
| 27 | 0 | 63 | 20 | 15 | 18 | 50 cm filaments immediately; 24 hrs later - 30 cm filaments. The solution gelled to a clear gel (yellow tinge) after another period of 3.5 hrs. |
| 27 | 0 | 63 | 12 | 42 | 20.5 | Solution almost gelled in flask but filaments up to 50 cm could be pulled immediately. After ca 6–5 hrs 15 cm filaments could be formed. Soln. nearly completely gelled after another period of 19.5 hrs to a pale yellow clear gel. |
| 17.5 | 0 | 63 | 20 | 17 | 8 | 6 cm filaments immediately. After ca ¾ hr - 15 cm filaments. After further period of ca 1¼ hr gave 20 cm filaments. After further period of ca 19¾ hr gave 35 cm filaments. After further period of ca 22½ hrs gave 15 cm filaments. Gelled in further period of 6 hr to a pale yellow clear gel. |
| 27 | 0.75 | 39 | 6 | 17 | 16 | Very visous/cloudy after removing 16 cm³ volatiles. 10 cm filaments pulled immediately. After ca 1 hr gave 25 cm filaments. Gelled overnight to a slightly cloudy gel. |
| 27 | 3.3 | 62 | 5 | 18 | 20 | Very pale yellow viscous solution obtained. 5 cm filament formed immediately. After ca ½ hr 30 cm filaments could be pulled. Gelled overnight to clear gel. |
| 27 | 5.5 | 46 | 2 | 20 | 20 | 5 cm filaments immediately. |

TABLE II-continued

Preparation of Filaments and rigid coherent gels

| Vol. of EtOH Initially (cm³) | Vol. of H₂O Initially (cm³) | Boiling point (B.P.) of solution (°C.) | Time to reach B.P. (mins) | Time at B.P. (mins) | Vol. of Ethanol removed (cm³) | Comments |
|---|---|---|---|---|---|---|
| | | | | | | After ca 2 hr 20 cm filaments could be formed. Gelled overnight to a clear gel. |

EXAMPLE 3

In the following series 13.44 g of the aluminum chlorhydrate-propylene glycol complex sold under the Trade Mark of REHYDROL as REHYDROL II was dissolved in a solution of 5.0 g technical ethyl silicate ($SiO_2$ equivalent to 40% by weight) in varying amounts of ethanol. In some case varying amounts of water were added. The resulting solutions were allowed to stand at ambient temperature or at 40° C. and periodically tested for filament formation by inserting into and pulling out of the solution a glass rod 10 mm diameter. The results are given in Table III.

TABLE III

Effect of water and temperature on filament formation [A.T. = ambient temperature]

| Vol. of Ethanol (cm³) | Vol. of Water (cm³) | Temp. (°C.) | Results |
|---|---|---|---|
| 27 | 0 | A.T. | Clear solution: after 41 hrs a pale yellow solution was obtained. No indication of filament formation after a further period of 25 hours. |
| 22.5 | 0 | A.T. | Clear solution: after 42 hrs gave a very pale yellow soln. After further period of 24 hrs crust formation and 7.5–10 cm filaments formed. After further period of 4 hrs 10–12 cm filaments could be formed. |
| 17.5 | 0 | A.T. | Slightly cloudy soln, which gave a very pale yellow viscous soln. on standing (with slight crust formation). 2.5–5 cm filaments could be pulled ca 43 hrs later. After further period of 6.5 hrs. 10 cm filament could be pulled. After further period of 17.5 hrs. 30 cm filament could be pulled. After further period of 4 hrs 30 cm filament could still be pulled. |
| 27 | 0 | 40 | Clear solution; after 21¾ hours gave a very pale yellow viscous soln. After 24 hrs. 2.5 cm filaments could be pulled. After further period of 4 hrs 2.5 cm filaments could be pulled. |
| 22.5 | 0 | 40 | Clear solution; after 22 hrs gave a very pale yellow viscous soln. from which 2.5–5 cm filaments could be pulled. After further period of 24 hrs a thick crust was formed and 12.5 cm filaments could be pulled. After further period of 4 hrs 15 cm filaments could be pulled. |
| 17.5 | 0 | 40 | Slightly cloudy soln. after 21¾ hrs. a very pale yellow viscous soln. a crust was formed and 12.5 cm filaments could be pulled. After a further period of 24 hrs - thick crust, 7.5–10 cm filaments after further period of 4 hrs a very viscous clear soln. resulted from which 0.6 cm filaments could be pulled. |
| 17.5 | 0.75 | A.T. | Slightly cloudy soln. after 20.5 hrs gave a very pale yellow viscous soln. After further period of 24 hrs-slight crust formation, 5 cm filaments; after further period of 4 hrs 15–17.5 cm filaments could be pulled. |
| 17.5 | 3.3 | A.T. | Clear soln. after 20 hours no detectable change. After further period of 24 hrs slight crust formation, no change over a further 4 hour period. |
| 17.5 | 5.5 | A.T. | Clear solution, after a period of 48.25 hours no detectable change occurred. |
| 17.5 | 0.75 | 40 | Cloudy solution, after 20 hrs gave a very pale yellow viscous soln. from which 10 cm filaments could be pulled. After a further period of 24 hrs-thick crust formation, 1 cm filaments. After further period of 4 hrs gellation was almost complete |
| 17.5 | 5.5 | 40 | Cloudy soln. after ca 19.5 hr gave a clear soln. with a slight crust. After a further period of 24 hrs - thin crust, 1 cm filaments. After a further period of 4 hrs - 2–5 cm filaments. |
| 17.5 | 3.3 | 40 | Cloudy soln. after ca 19.25 hrs gave a clear solution with a slight crust. After a further period of 24 hrs.-thin crust, 5 cm filaments. After a further period of 4 hrs. - 2–5 cm filaments. |

EXAMPLE 4

Filaments having the composition corresponding to the molar ratio $Al_2O_3:SiO_2$ of 1.44:1 were obtained by the following preferred method.

20 g of technical ethyl silicate ($SiO_2$ equivalent to 40% by weight) was added to 70 cm³ ethanol; this solution was vigorously stirred while 53.76 g of the aluminum chlorhydrate-propylene glycol complex sold under the trade mark of REHYDROL as REHYDROL II was slowly added. To the solution 3 cm³ of water was added, then the mixture was brought to reflux temperature and kept at this temperature for 1 to 1½ hours. Filaments up to 22 cm in length could be drawn for a period of 2 to 2½ hours by inserting into and pulling out from the solution a glass rod 10 mm in diameter.

EXAMPLE 5

Filaments having the composition corresponding to the molar ratio of $Al_2O_3:SiO_2$ as 1.44:1 were obtained by the following preferred method.

80.64 g of the aluminum chlorhydrate-propylene glycol complex sold under the Trade Mark of REHYDROL as REHYDROL II was dissolved in a solution of 30 g technical ethyl silicate ($SiO_2$ equivalent to 40% by weight) in 162 cm$^3$ ethanol. Then 108 cm$^3$ ethanol was removed under reduced pressure at a temperature between 80° C. and 90° C. in a period of about 20 minutes, using a rotary evaporator, giving a highly viscous solution. Filament formation was tested by inserting into a pulling out from the solution a glass rod 10 mm in diameter. Filaments could be pulled from the solution immediately; filaments up to ca 90 cm long were formed. Filaments could be pulled from the solution for a period >24 hours.

After firing to 1000° C. for one hour, the ceramic fibers obtained remained transparent.

EXAMPLE 6

Ethanol (17.50 cm$^3$, 13.81 g) was placed in a beaker, the contents of which could be stirred by an electrically driven link stirrer. Aluminum chlorhydrate-propylene glycol complex (sold under the Registered Trade Mark of REHYDROL as REHYDROL II) was added in 3.00 g portions, allowing each portion to dissolve almost completely before the next was added. Filaments could only be obtained when more than 15 g of complex had been added. When 18 g of complex had been added, a viscous liquid was obtained. On standing for 30 minutes, alumina precursor filaments up to 15 cm long could be obtained.

Filament formation was assessed by inserting into and pulling out from the solution a glass rod 10 mm in diameter followed by visual inspection to see if a filament was formed. The ethanol used was the United Kingdom 74 over proof grade. The aluminum chlorhydrate-propylene glycol complex had the following properties:

| Analysis | Found | $Al_2(OH)_5Cl.H_2O$ (propyleneglycol) requires |
|---|---|---|
| $Al_2O_3$ | 37.8% | 38% |
| Chloride (Cl) | 13.9% | 13.2% |
| Al:Cl atomic ratio | 1.9:1 | 2:1 |
| Propylene glycol | 29.5% | 28.3% |
| pH (30% w/w soln) | 4.1 | |

EXAMPLE 7

13.44 g of aluminum chlorhydrate-propylene glycol complex (as used in Example 6) was dissolved in varying amounts of ethanol or ethanol/water solutions. The ethanol used was the United Kingdom 74 over proof material. As in Example 6, the resulting solutions were allowed to age in air at ambient temperature and filament formation was assessed as given in Example 6. The filaments were alumina precursor filaments. Eventually all the solutions gelled on storage. The results obtained are given in Table IV below.

TABLE IV

Filament and rigid coherent gel formation from aluminium chlorhydrate - propylene glycol complex

| Volume of ethanol added (cm$^3$) | Volume of water added (cm$^3$) | Gel time (days) | Filament Formation |
|---|---|---|---|
| 17.50 | NIL | 7 | Filaments up to 17.8 cm long formed prior to gelation |
| 22.50 | NIL | 10 | Filaments up to 12.7 cm long formed prior to gelation |
| 27.00 | NIL | 11 | Filaments up to 25 cm long formed prior to gelation |
| 17.50 | 0.75 | 7 | Filaments up to 25 cm long formed prior to gelation |
| 17.50 | 3.30 | 12 | Filaments up to 15 cm long formed prior to gelation |
| 17.50 | 5.50 | 16 | Filaments up to 38 cm long formed prior to gelation |

All the gels obtained were clear rigid coherent gels

EXAMPLE 8

80.64 g of the aluminum chlorhydrate-propylene glycol complex sold under the Registered Trade Mark of REHYDROL as REHYDROL II was added slowly with stirring to 162 cm$^3$ of ethanol (74 over-proof I.M.S.) and stirred to give a clear solution, which was evaporated under reduced pressure, keeping the temperature in the range 95°–100° C. A total of 102 cm$^3$ ethanol was removed, giving a viscous liquid from which filaments could be drawn. Filaments up to 38 cm long could be obtained. Filaments could be drawn from the solution for up to about 24 hours after the removal of ethanol by evaporation had been completed. The filaments drawn showed no cyrstallinity on examination by X-ray diffraction. On firing the filaments at 1000° C. for 2 hours an alumina fiber was obtained, shown by X-ray diffraction to be a crystalline alumina fiber.

When it was no longer possible to draw filaments, a clear rigid coherent gel was formed when the solution was allowed to stand.

EXAMPLE 9

80.64 g of the aluminum chlorhydrate-propylene glycol complex sold under the Registered Trade Mark of REHYDROL as REHYDROL II was added slowly with stirring to 162 cm$^3$ of water. A total of 118 cm$^3$ water was removed by evaporation under reduced pressure to give a viscous liquid. On ageing of this liquid for 1–2 hours, filaments up to 182 cm could be drawn from the liquid, until the ageing period was 24 hours. The filaments drawn showed no crystallinity on examination by X-ray diffraction. On firing the filaments at 1000° C. for 2 hours an alumina fiber was obtained, shown by X-ray diffraction to be a crystalline alumina fiber.

After 24 hours ageing a clear, rigid coherent gel was obtained.

EXAMPLE 10

(a) The clear rigid coherent gel obtained by the procedure of example 8 was fired for two hours at 1400° C. The resulting product was shown by X-ray diffraction to be alpha-alumina.

(b) The filaments whose preparation is described in example 8 were fired at 1000° C. for two hours and shown by X-ray diffraction to give a crystalline alumina fiber, which was gamma-alumina.

(c) The filaments whose preparation is described in example 8 were fired at 1400° C. for two hours and shown by X-ray diffraction to give a crystalline alumina fiber, which was alpha-alumina.

(d) The clear rigid coherent gel obtained by the procedure of example 9 was fired for two hours at 1400° C. The resulting product was shown by X-ray diffraction to be alpha-alumina. (e) The filaments whose preparation is described in example 9 were fired at 1000° C. for two hours and shown by X-ray diffraction to give a crystalline alumina fiber, which was gamma-alumina.

(f) The filaments whose preparation is described in example 9 were fired at 1400° C. for two hours and shown by X-ray diffraction to give a crystalline alumina fiber, which was alpha-alumina.

(g) The filaments whose preparation is described in example 4 were fired at 1400° C. for two hours and shown by X-ray diffraction to give a crystalline ceramic fiber, whose X-ray diffraction pattern matched that of a sample of fused mullite grain.

(h) The gels whose preparation is described in example 2 were fired at 1400° C. for two hours. The X-ray diffraction pattern of the resulting product matched that of a sample of fused mullite grain.

The preparation and properties of the fused mullite grain used as standard in (g) and (h) are described by Sargeant, Isherwood and Atthis. *Refractories Jnl.* 1973 (6), p.12.

EXAMPLE 11

9.96 g of anhydrous zirconium tetrachloride was dissolved in a solution of 200 cm$^3$ ethanol and 37.20 g of technical ethyl silicate. Some HCl gas was liberated during addition of the zirconium tetrachloride. Then 100 g aluminum chlorhydrate-propylene glycol complex (sold under the trade mark of REHYDROL as REHYDROL II) was added in portions with stirring to give a clear solution. After removing 115 cm$^3$ of solvent filaments up to about 35 cm long could be drawn from the solution for up to about three hours after solvent removal was finished. At this stage, the solution formed a clear rigid coherent gel.

The filaments and the clear coherent gel were fired at 1000° C. for two hours. The filaments formed a ceramic fiber in which the crystalline phase was gamma-alumina. The clear coherent gel also gave gamma-alumina as the crystalline phase.

In this example the filaments and gel have the oxide stoichiometry of mullite plus 10% w/w $ZrO_2$.

EXAMPLE 12

9.24 g of $CrCl_3.6H_2O$ crystals was dissolved in a solution of 200 cm$^3$ ethanol and 37.20 g of technical ethyl silicate. Then 100 g of aluminum chlorhydrate-propylene glycol complex (sold under the trade mark of REHYDROL as REHYDROL II) was added in portions to give a clear solution. After removing 125 cm$^3$ of solvent, green filaments up to about 60 cm long could be drawn from the resulting solution. Filaments could be drawn from the solution for up to 24 hours after solvent removal was finished. At this stage, the solution formed a clear rigid coherent gel.

In this example, the filaments and gel have the oxide stoichiometry of mullite plus 5% w/w $Cr_2O_3$.

The filaments and the clear coherent gel were fired at 1000° C. for two hours. The filaments formed a ceramic fiber in which the crystalline phase was gamma alumina. The clear coherent gel also gave gamma alumina as the crystalline phase.

EXAMPLE 13

18.47 g of $CrCl_3.6H_2O$ crystals was dissolved in a solution of 200 cm$^3$ ethanol and 37.20 g of technical ethyl silicate. Then 100 g of aluminum chlorhydrate-propylene glycol complex (sold under the trade mark of REHYDROL as REHYDROL II) was added in portions with stirring to give a clear green solution. After removing 136 cm$^3$ of solvent, green filaments up to about 50 cm long could be drawn from the resulting solution. Filaments could be drawn from the solution for up to 24 hours after solvent removal was finished. At this stage, the solution formed a clear, coherent rigid gel.

The filaments and the clear coherent gel were fired at 1000° C. for two hours. The filaments formed a ceramic fiber in which the crystalline phase was gamma alumina. The clear coherent gel also gave gamma alumina as the crystalline phase.

In this example, the filaments and gel have the oxide stoichiometry of mullite plus 10% w/w $Cr_2O_3$.

EXAMPLE 14

36.15 g of triethyl borate was added with stirring to a solution of 200 cm$^3$ ethanol and 37.20 g of technical ethyl silicate. Then 100 g of aluminum chlorhydrate-propylene glycol complex (sold under the trade mark of REHYDROL as REDHYROL II) was added in portions with stirring, to give a clear solution. After removing 165 cm$^3$ of solvent, filaments up to 60 cm long could be drawn from the resulting solution. Filaments could be drawn from the solution for up to 24 hours after solvent removal was finished. At this stage, the solution formed a clear, coherent rigid gel.

The filaments and the clear coherent gel were fired at 1000° C. for two hours. The filaments formed a ceramic fiber in which the crystalline phase was mullite. The clear coherent gel also gave mullite as the crystalline phase. In each case, conversion to mullite was good, the X-ray diffraction pattern matching that of the sintered mullite grain described by Sargeant, Isherwood and Atthis. Refractories Jnl. 1973, (6), p.12.

The solution from which the filaments and gel were prepared has the oxide stoichiometry
2.99 $Al_2O_3:2SiO_2:1B_2O_3$

EXAMPLE 15

9.77 g of $CaCl_2.2H_2O$ was dissolved in 200 cm$^3$ distilled water and 100 g of aluminum chlorhydrate-propylene glycol complex (sold under the trade mark of REHYDROL as REHYDROL II) was added in portions with stirring to form a clear solution. After removing 142 cm$^3$ of solvent, by concentrating in a rotary evaporator, a viscous liquid was obtained, from which filaments up to 90 cm long could be obtained. Filaments could be obtained for up to 24 hours after solvent removal was finished. At this stage, a clear coherent gel was formed.

The filaments and the clear coherent gel were fired at 1000° C. for two hours. The filaments formed a ceramic fiber in which the crystalline phase was gamma alumina. The clear coherent gel also gave gamma alumina as the crystalline phase.

In this example, the filaments and gel have the oxide stoichiometry of alumina plus 10% w/w CaO.

EXAMPLE 16

19.07 g of $MgCl_2.6H_2O$ was dissolved in 200 $cm^3$ distilled water and 100 g of aluminum chlorhydrate-propylene glycol complex (sold under the trade mark of REHYDROL as REHYDROL II) was added in portions, with stirring to form a clear solution. After removing 144 $cm^3$ of solvent by concentrating in a rotary evaporator, a viscous liquid was obtained, from which filaments up to 90 cm long could be obtained. Filaments could be obtained for up to 24 hours after solvent removal was finished. At this stage, a clear coherent gel was formed.

In this example, the filaments and gel have the oxide stoichiometry of alumina plus 10% w/w MgO.

The filaments and the clear coherent gel were fired at 1000° C. for two hours. The filaments formed a ceramic fiber in which the crystalline phase was spinel. The clear coherent gel also gave spinel as the crystalline phase.

EXAMPLE 17

100 g of the aluminum chlorhydrate propylene glycol complex sold under the trade mark of REHYDROL as REHYDROL II and 35.26 g of anhydrous magnesium chloride were dissolved in 200 $cm^3$ water (preferably distilled water). This gives a solution in which the molar ratio $Al_2O_3$:MgO is 1:1 (i.e. spinel). 70 $cm^3$ of volatiles were removed at 70° C. under reduced pressure. Filaments up to 9 cm long could be drawn from the resulting solution. Filaments could be drawn for up to about 15 minutes after removal of volatiles was ended. At this stage a clear coherent gel was formed.

EXAMPLE 18

100 g of the aluminum chlorhydrate propylene glycol complex sold under the trade mark of REHYDROL as REHYDROL II was dissolved in a solution of 200 $cm^3$ ethanol and 111.38 g of technical ethyl silicate. This gives a solution in which the molar ratio $Al_2O_3$:$SiO_2$ is 1:2. 135 $cm^3$ of solvent was removed at 70° C. under reduced pressure, giving a solution from which filaments could be drawn and which ultimately formed a clear coherent gel.

The filaments and the gel were fired at 1000° C. for two hours. The filaments formed a ceramic fiber in which the crystalline phase was mullite. The clear coherent gel gave gamma alumina as the crystalline phase.

EXAMPLE 19

100 g of the aluminum chloride propylene glycol complex sold under the trade mark of REHYDROL as REHYDROL II was dissolved in a solution of 200 $cm^3$ ethanol and 4.73 g of technical ethyl silicate. 100 $cm^3$ of solvent was removed at 70° C. under reduced pressure, giving a solution from which filaments could be drawn and which ultimately formed a clear coherent gel.

The filaments and the gel were fired at 1000° C. for two hours. The filaments formed a ceramic fiber in which the crystalline phase was gamma alumina. The clear coherent gel also gave gamma alumina as the crystalline phase.

In this example, the filaments and gel have the oxide stoichiometry of alumina plus 5% w/w $SiO_2$.

We claim:

1. A process for the preparation of a ceramic fiber from a ceramic oxide fiber precursor solution without the need for a fiber-forming organic polymer or a coagulating bath, such process comprising forming a homogeneous clear solution by dissolving in a mixture of water and a $C_1$-$C_4$ alcohol an aluminum halohydrate organic complex obtained from an aluminum halohydrate and a polyol containing 2 to 6 carbon atoms and at least 2 hydroxy groups, evaporating solvent to cause polymerization, and drawing from the concentrated solution a clear homogeneous ceramic oxide precursor filament which on firing forms a ceramic fiber.

2. A process as claimed in claim 1 including incorporating at least one salt or at least one alkoxide which assist in the formation of or enhance the properties of said precursor or ceramic fibers.

3. A process as claimed in claim 2 wherein said salt is a chloride of an element selected from the group consisting of calcium, magnesium, chromium, and zirconium.

4. A process as claimed in claim 3 in which said chloride is magnesium chloride and is provided in a quantity to give the oxide stoichiometry of spinel $MgO.Al_2O_3$.

5. A process as claimed in claim 2 wherein said alkoxide is an alkoxide of boron.

6. A process as claimed in claim 1 wherein said polyol is selected from the group consisting of
   1, 2 propylene glycol,
   1, 1, 1 trimethylolpropane,
   1, 3 butane diol,
   1, 2, 3 trihydroxypropane,
   2 methyl 2, 4 pentanediol, and
   2, 2 dimethyl 1, 3 dihydroxypropane,
and wherein said aluminum halohydrate is an aluminum chlorhydrate.

7. A process as claimed in claim 1 wherein said $C_1$-$C_4$ alcohol is ethanol.

8. A process for the preparation of a ceramic fiber from a ceramic oxide fiber precursor solution without the need for a fiber-forming organic polymer or a coagulating bath, such process comprising forming a homogeneous clear solution by dissolving in a mixture of water and a $C_1$-$C_4$ alcohol an aluminum halohydrate organic complex obtained from an aluminum halohydrate and a polyol containing 2 to 6 carbon atoms and at least 2 hydroxy groups, incorporating in the solution an organic silicate containing at least one $C_1$-$C_6$ alkoxy group under conditions to form a solution from which a clear homogeneous ceramic oxide precursor filament can be drawn and drawing from the solution a clear homogeneous ceramic oxide precursor filament which on firing forms a ceramic fiber.

9. A process according to claim 8, wherein the solution is concentrated by evaporation of solvent.

10. A method as claimed in claim 8 wherein the organic silicate is technical ethyl silicate.

* * * * *